Patented Aug. 21, 1934

1,970,562

UNITED STATES PATENT OFFICE 1,970,562

MANUFACTURE OF FLUORO-HALO DERIVATIVES OF HEXACHLOROETHANE

Albert L. Henne, Columbus, Ohio, assignor, by mesne assignments, to General Motors Corporation, a corporation of Delaware No Drawing. Application April 10, 1931, Serial No. 529,285. Renewed October 31, 1933

4 Claims. (Cl. 260—162)

This invention relates to chemistry and chemical processes and more particularly to chemical processes for the manufacture of fluoro and/or halo-fluoro derivatives of hexachloroethane.

The objects of my present invention are to provide a process or processes for the manufacture of fluoro and/or halo-fluoro derivatives of hexachloroethane by first reducing the melting point of the hexachloroethane and subsequently fluorating the liquid so produced by the use of HF as a fluorating agent.

As a specific example of my invention, the addition of 75 parts of antimony pentachloride to 213 parts of hexachloroethane, or the addition of 57 parts of antimony trichloride and 17 parts of chlorine to 213 parts of hexachloroethane, lowers the melting point of the $C_2Cl_6$ from approximately 186° C. to about 130° C.

When the compounds are mixed in these proportions and slightly heated, the mixture will become a liquid. In this liquid state, the $C_2Cl_6$ is fluorated by interacting HF with the liquid mixture.

In order to obtain $C_2Cl_2F_4$ in preference to other chlorofluorides, dephlegmation and control of the delivery of the reaction products are employed. The dephlegmation temperature is maintained at approximately 5° C. and the working pressure is maintained approximately at 1 atmosphere.

The dephlegmator returns $C_2Cl_3F_3$, $C_2Cl_4F_2$, $C_2Cl_5F$, and any unacted upon $C_2Cl_6$ to the reaction chamber where these compounds are further fluorated to the desired extent.

The reactions taking place are substantially as follows:

1. $C_2Cl_6 + SbCl_5 + 4HF \rightarrow C_2Cl_2F_4 + 4HCl + SbCl_5$
2. $C_2Cl_6 + SbCl_3 + Cl_2 + 4HF \rightarrow C_2Cl_2F_4 + 4HCl + SbCl_3 + Cl_2$ In practice the process is made continuous by feeding the reactants $C_2Cl_6$ and HF to the reaction chamber and by discharging the $C_2Cl_2F_4$ and HCl from the top of the dephlegmator. The HCl may be separated from the $C_2Cl_2F_4$ in any known manner.

Other compounds such as $C_2Cl_5F$, $C_2Cl_3F_3$, or $C_2Cl_4F_2$ can be obtained from $C_2Cl_6$ by the method described above. In order to obtain any single one of these compounds in preference to the others, the temperature and pressure conditions are caused to approximate the vapor pressure characteristics of the desired compound. For example, it is advantageous to operate at about 48° C. and about 1 atmosphere to obtain a favorable yield of $C_2Cl_3F_3$.

While I have disclosed a specific example of my process for obtaining $C_2Cl_2F_4$ by dephlegmating at a temperature of substantially 5° C. at atmospheric pressures, and for obtaining $C_2Cl_3F_3$ by dephlegmating at a temperature of substantially 48° C. at atmospheric pressure, the process can be carried out at a higher or lower pressure with a corresponding change in temperature. The temperature and pressure of dephlegmation approximates the vapor pressure characteristics of the desired product.

The preceding fluorations are described as one-step processes. However, the same results can be obtained by a plurality of multiple-step processes. As a specific example, $C_2Cl_4F_2$ can be obtained by fluoration of $C_2Cl_6$ to $C_2Cl_5F$ and subsequent fluoration of $C_2Cl_5F$ to $C_2Cl_4F_2$—similarly, $C_2F_4Cl_2$ could be obtained by fluoration of $C_2Cl_6$ to $C_2Cl_3F_3$, and further fluoration of the latter to $C_2Cl_2F_4$.

While I have disclosed specific modes of reducing the melting point of $C_2Cl_6$, it should be understood that in its broad aspect my invention contemplates the fluoration of $C_2Cl_6$ by first reducing the melting point of the $C_2Cl_6$ and then fluorating by the interaction of HF with the liquefied $C_2Cl_6$.

What is claimed is as follows:

1. The process comprising lowering the melting point of $C_2Cl_6$ and reacting with HF to replace at least one chlorine atom with fluorine.

2. The process comprising mixing with $C_2Cl_6$ a substance capable of reducing its melting point, liquefying the mixture, and fluorating by reacting the liquefied mixture with HF to replace at least one chlorine atom with fluorine.

3. The method of manufacturing $C_2Cl_2F_4$ from $C_2Cl_6$ which consists in mixing with $C_2Cl_6$ a substance capable of lowering the melting point of the $C_2Cl_6$, liquefying the mixture, and reacting the liquefied mixture with HF.

4. The method of manufacturing $C_2Cl_2F_4$ comprising mixing an antimony halide with $C_2Cl_6$ to reduce the melting point of the $C_2Cl_6$, liquefying the mixture and interacting the liquefied mixture with HF to form $C_2Cl_2F_4$.

ALBERT L. HENNE.